(12) United States Patent
Ono et al.

(10) Patent No.: US 10,677,125 B2
(45) Date of Patent: Jun. 9, 2020

(54) EXHAUST GAS PURIFICATION APPARATUS FOR INTERNAL COMBUSTION ENGINE

(71) Applicant: TOYOTA JIDOSHA KABUSHIKI KAISHA, Toyota-shi (JP)

(72) Inventors: Ryohei Ono, Susono (JP); Masaaki Sato, Susono (JP); Katsuhiro Ito, Mishima (JP); Akira Mikami, Mishima (JP); Kazuhiro Umemoto, Ebina (JP); Daichi Imai, Sunto-gun (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/210,008

(22) Filed: Dec. 5, 2018

(65) Prior Publication Data

US 2019/0186316 A1   Jun. 20, 2019

(30) Foreign Application Priority Data

Dec. 18, 2017   (JP) .................................. 2017-242062

(51) Int. Cl.
*F01N 3/08*   (2006.01)
*B60W 10/06*   (2006.01)
*B01D 53/94*   (2006.01)

(52) U.S. Cl.
CPC ....... *F01N 3/0814* (2013.01); *B01D 53/9481* (2013.01); *B01D 53/9495* (2013.01); *B60W 10/06* (2013.01); *B01D 2257/404* (2013.01); *B01D 2257/502* (2013.01); *B01D 2257/504* (2013.01); *B01D 2257/702* (2013.01); *F01N 3/0835* (2013.01); *F01N 3/0842* (2013.01); *F01N 3/0857* (2013.01);

(Continued)

(58) Field of Classification Search
CPC ............. B01D 53/9481; F01N 2240/16; F01N 2550/22; F01N 2900/104
See application file for complete search history.

(56) References Cited

U.S. PATENT DOCUMENTS

| 2003/0172643 A1* | 9/2003 | Suzuki | B60K 6/48 60/284 |
| 2011/0078999 A1* | 4/2011 | Gonze | F01N 3/2026 60/286 |
| 2018/0163592 A1* | 6/2018 | Hirooka | F01N 3/20 |

FOREIGN PATENT DOCUMENTS

| JP | 60122216 A * | 6/1985 | ............. F01N 9/002 |
| JP | 2012-207630 | 10/2012 | |

* cited by examiner

*Primary Examiner* — Jonathan R Matthias
(74) *Attorney, Agent, or Firm* — Oblon, McClelland, Maier & Neustadt, L.L.P.

(57) ABSTRACT

An exhaust gas purification apparatus for an internal combustion engine includes the adsorbent, the catalyst and the heat generating element, wherein in cases where the residual capacity of the battery is smaller than a first predetermined value required for raising the temperature of the catalyst to an activation temperature thereof, and in cases where the residual capacity of the battery is larger than a second predetermined value which is smaller than the first predetermined value and which is required for raising the temperature of the adsorbent to a predetermined temperature at which the adsorbent exhibits adsorption performance required at the time of starting of the internal combustion engine, an amount of electric power to be supplied to the heat generating element from the battery is adjusted such that the temperature of the adsorbent becomes the predetermined temperature.

5 Claims, 5 Drawing Sheets

(52) U.S. Cl.
CPC ...... *F01N 2240/16* (2013.01); *F01N 2240/18* (2013.01); *F01N 2250/12* (2013.01); *F01N 2550/22* (2013.01); *F01N 2560/06* (2013.01); *F01N 2900/104* (2013.01); *F01N 2900/1404* (2013.01); *F01N 2900/1602* (2013.01); *F01N 2900/1621* (2013.01)

EXHAUST GAS PURIFICATION APPARATUS FOR INTERNAL COMBUSTION ENGINE

CROSS REFERENCE TO RELATED APPLICATIONS

This application claims priority to Japanese Patent Application No. 2017-242062 filed on Dec. 18, 2017 the entire contents of which are incorporated by reference herein.

TECHNICAL FIELD

The present disclosure relates to an exhaust gas purification apparatus for an internal combustion engine.

Description of the Related Art

There has been known a technique in which an adsorption catalyst to adsorb harmful components contained in exhaust gas, a catalyst to purify or remove harmful components, and a heater to heat the adsorption catalyst are arranged in an exhaust passage of an internal combustion engine, wherein the adsorption catalyst is heated by using the heater at the time of cold starting of the internal combustion engine (for example, refer to patent literature 1).

CITATION LIST

Patent Literature

Patent Literature 1: Japanese patent application laid-open publication No. 2012-207630

SUMMARY

Technical Problem

If an adsorbent and a catalyst have been heated by using an electric heater before the starting of an internal combustion engine, the internal combustion engine can be started in a state where the adsorption performance of the adsorbent is high, or in a state where the purification performance of the catalyst is high. Here, there is a difference between a temperature at which the adsorbent is able to adsorb exhaust gas components in an efficient manner and a temperature at which the catalyst is able to purify or remove the exhaust gas components in an efficient manner, and hence when heating the adsorbent and the catalyst by means of the electric heater, the exhaust gas purification performance of a system as a whole changes depending on the temperature to which they are raised.

In addition, in the case of using the electric heater, it is necessary to supply electric power to the electric heater from a battery, but when a residual capacity (a state of charge, i.e., hereinafter also referred to as an SOC) of the battery is small, the adsorbent and the catalyst may not be raised to a desired temperature. If the heating by the electric heater is stopped at temperatures at which the adsorption efficiency of exhaust gas components in the adsorbent is low, or at temperatures at which the purification efficiency of exhaust gas components in the catalyst is low, there will be a fear that the purification rate of the exhaust gas in the system as a whole may drop.

The present disclosure has been made in view of the problems as mentioned above, and the object of the disclosure is to heat an adsorbent and a catalyst in an appropriate manner according to a residual capacity of a battery, thereby to maintain high a purification rate of exhaust gas in a system as a whole.

Solution to Problem

One form of the present disclosure is an exhaust gas purification apparatus for an internal combustion engine comprising: an adsorbent that is arranged in an exhaust passage of the internal combustion engine and configured to adsorb a predetermined component contained in an exhaust gas of the internal combustion engine; a catalyst that is arranged in said exhaust passage at a location downstream of said adsorbent and configured to purify said predetermined component; a heat generating element that is arranged in said exhaust passage and is supplied with electric power to generate heat thereby to heat said adsorbent and said catalyst; a battery configured to supply electric power to said heat generating element; and a controller configured to adjust an amount of electric power to be supplied to said heat generating element from said battery such that in cases where a residual capacity of said battery is smaller than a first predetermined value required for raising the temperature of said catalyst to a lower limit value of a temperature range in which said catalyst is activated, and in cases where the residual capacity of said battery is larger than a second predetermined value which is smaller than said first predetermined value and which is required for raising the temperature of said adsorbent to a predetermined temperature within a temperature range in which said adsorbent exhibits adsorption performance required at the time of starting of said internal combustion engine, the temperature of said adsorbent becomes said predetermined temperature.

A component adsorbed by the adsorbent and a component purified or removed by the catalyst are the same component. As the predetermined component, there can be exemplified HC, CO, NOx, or $CO_2$. The heat generating element may be arranged in the exhaust passage at the upstream side of said adsorbent, or may be arranged in the exhaust passage as a carrier for the adsorbent and the catalyst. In cases where the temperature of the catalyst is lower than a lower limit value of an activation temperature thereof, the purification performance for the predetermined component in the catalyst is not sufficient. For that reason, when an SOC of the battery is smaller than the first predetermined value, the purification performance in the catalyst can not be improved to a sufficient extent, even if electric power is supplied to the heat generating element so as to heat the catalyst. On the other hand, the temperature range in which the adsorbent exhibits the adsorption performance required at the time of starting of the internal combustion engine is lower than the temperature range in which the catalyst is activated. Accordingly, even in cases where the catalyst can not be heated to a temperature at which it is activated because the SOC is small, the adsorbent may be able to be heated to a temperature at which the adsorption performance required of the adsorbent can be exhibited. However, in cases where the residual capacity of the battery is equal to or more than the second predetermined value, when the amount of electric power corresponding to the residual capacity is supplied to the heat generating element, the temperature of the catalyst will not reach its activation temperature, and the temperature of the adsorbent will exceed the temperature range in which the required adsorption performance is exhibited. In such a state, adsorption of the predetermined component in the adsorbent will not be sufficient, and the purification of the predetermined component in the catalyst will also be in an insufficient state. When the internal combustion engine is started in such a state, a larger amount of the predetermined component may be discharged from the internal combustion engine at the time of starting of the internal combustion engine, as a result of which the exhaust gas containing a high concentration of the predetermined component may flow into the catalyst, thus giving rise to a fear that the predetermined component can not be purified or removed to a sufficient extent in the catalyst. Here, note that the residual capacity of the battery may also be a residual capacity which is secured or reserved in order to supply electric power to the heat generating element. That is, the electric power required by equipment other than the heat generating element may also be secured or reserved separately.

In cases where the residual capacity of the battery is in the above state, when an amount of electric power is supplied to the heat generating element in such a manner that the adsorbent becomes the predetermined temperature which is a temperature at which the adsorbent exhibits the adsorption performance required at the time of starting of the internal combustion engine, the predetermined component often discharged at the time of starting of the internal combustion engine can be caused to adsorb to the adsorbent. With this, it is possible to suppress the predetermined component from passing through the catalyst at the time of starting of the internal combustion engine. In addition, even if the temperature of the adsorbent is thereafter raised due to the heat of the exhaust gas of the internal combustion engine so that the predetermined component desorbs from the adsorbent, the concentration of the predetermined component flowing into the catalyst is low, as compared with when the internal combustion engine is started in a state where the temperature of the adsorbent is made as high as possible. Although the temperature of the catalyst at this time has not been raised up to a temperature required for purifying or removing the predetermined component, the predetermined component can be removed to a more or less extent in the catalyst, so that when the concentration of the predetermined component flowing into the catalyst is low, the purification or removal rate of the predetermined component in the catalyst becomes accordingly high. Thus, the concentration of the predetermined component flowing out from the catalyst can be decreased.

In this manner, even in cases where the residual capacity of the battery is in a state capable of making the temperature of the adsorbent higher than the predetermined temperature, but in cases where it is in a state incapable of activating the catalyst, the purification rate of the exhaust gas in the system as a whole can be maintained high by supplying to the heat generating element only an amount of electric power with which the temperature of the adsorbent just reaches the predetermined temperature.

In cases where the residual capacity of said battery is larger than said first predetermined value, said controller can adjust the amount of electric power to be supplied to said heat generating element from said battery such that the temperature of said catalyst falls within said temperature range in which said catalyst is activated.

When the residual capacity of the battery is such that the catalyst can be heated to its activation temperature, the predetermined component can be purified or removed by the catalyst by heating the catalyst to its activation temperature, even at the time of starting of the internal combustion engine. Accordingly, the concentration of the predetermined component flowing out from the catalyst can be decreased.

In cases where the residual capacity of said battery is smaller than said second predetermined value, said controller can supply an amount of electric power corresponding to the residual capacity to said heat generating element from said battery.

In this case, the adsorption performance of the adsorbent becomes higher as the temperature of the adsorbent becomes higher, so that the concentration of the predetermined component flowing into the catalyst at the time of starting of the internal combustion engine can be reduced by heating the adsorbent as much as possible. As a result, it is possible to reduce the concentration of the predetermined component flowing out from the catalyst.

Said controller can correct said first predetermined value according to a degree of deterioration of said catalyst.

Because the activation temperature of the catalyst changes with the degree of deterioration of the catalyst, the residual capacity of the battery required for raising the temperature of the catalyst to its activation temperature also changes. Thus, by correcting the first predetermined value according to an amount of change in the degree of deterioration of the catalyst, it becomes possible to attain more suitable adjustment of the amount of electric power.

Said controller can correct said second predetermined value according to a degree of deterioration of said adsorbent.

The temperature range in which the adsorbent exhibits the adsorption performance required at the time of starting of the internal combustion engine changes with the degree of deterioration of the adsorbent, so the predetermined temperature may also change. Accordingly, the residual capacity of the battery required for raising the temperature of the adsorbent to the predetermined temperature may also change. Thus, by correcting the second predetermined value according to an amount of change in the degree of deterioration of the catalyst, it becomes possible to attain more suitable adjustment of the amount of electric power.

Advantageous Effects

According to the present disclosure, it is possible to heat the adsorbent and the catalyst in an appropriate manner according to the residual capacity of the battery, thereby to maintain high the purification rate of exhaust gas in the system as a whole.

DESCRIPTION OF THE EMBODIMENTS

Hereinafter, the best mode for carrying out the present disclosure will be exemplarily described in detail based on a preferred embodiment with reference to the attached drawings. However, the dimensions, materials, shapes, relative arrangements and so on of component parts described in the embodiment are not intended to limit the scope of the present disclosure to these alone in particular as long as there are no specific statements.

Embodiment

Figure 1:
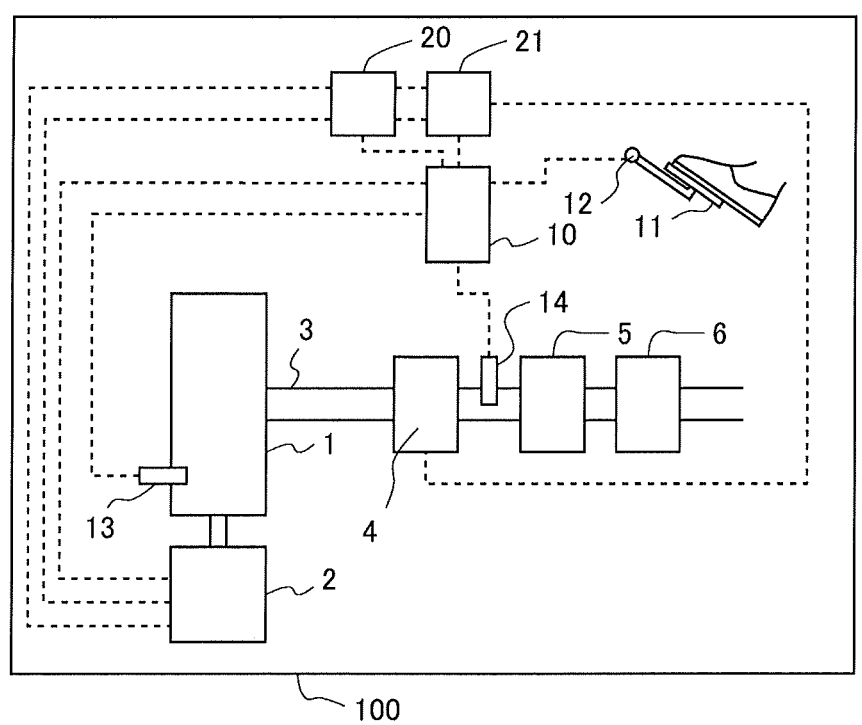
FIG. 1 is a view showing the schematic construction of an exhaust gas purification apparatus for an internal combustion engine according to an embodiment of the present disclosure.

FIG. 1 is a view showing the schematic construction of an exhaust gas purification apparatus for an internal combustion engine according to an embodiment of the present disclosure. An internal combustion engine 1 is mounted on a hybrid vehicle 100. Here, note that the internal combustion engine 1 may be either a gasoline engine or a diesel engine. In addition, an electric motor 2 is mounted on the hybrid vehicle 100. The hybrid vehicle 100 according to this embodiment can be driven by the internal combustion engine 1 or the electric motor 2. Moreover, the electric motor 2 is provided with a power generation function, and electricity or electric power can be generated by means of the electric motor 2 using the internal combustion engine 1 as a power source. A battery 20 is connected to the electric motor 2 through electrical wiring. Here, note that the exhaust gas purification apparatus for an internal combustion engine according to this embodiment is mounted on the hybrid vehicle 100, but it is not limited to this and can also be mounted on a vehicle which is not provided with the electric motor 2.

An exhaust passage 3 is connected to the internal combustion engine 1. An electric heater 4 is arranged in the middle of the exhaust passage 3. For the electric heater 4, there is used a material such as for example SiC or metal, which has electric resistance and is electrically energized to generate heat. Here, note that in this embodiment, the electric heater 4 corresponds to a heat generating element in the present disclosure. The electric heater 4 is also electrically connected to a battery 20 through a voltage control device 21. The voltage control device 21 is operated by an ECU 10 to be described later, and the ECU 10 adjusts a voltage to be applied from the battery 20 to the electric heater 4.

In the exhaust passage 3 at the downstream side of the electric heater 4, there are arranged an adsorbent 5 for adsorbing a predetermined component in exhaust gas, and a catalyst 6 for purifying or removing the predetermined component in the exhaust gas, sequentially from an upstream side. The adsorbent 5 according to this embodiment adsorbs NOx as the predetermined component. In addition, the catalyst 6 according to this embodiment is a catalyst which purifies or reduces NOx as the predetermined component, and is for example a three-way catalyst or an NOx selective catalytic reduction catalyst. Here, note that in this embodiment, an explanation will be made by exemplifying NOx as the predetermined component, but this predetermined component may be HC, CO, $CO_2$, etc., in place of NOx. The adsorbent 5 and the catalyst 6 need only be selected so that a component adsorbed by the adsorbent 5 and a component purified or reduced by the catalyst 6 are the same component. In addition, in this embodiment, the electric heater 4 is arranged at the upstream side of the adsorbent 5 and the catalyst 6, but instead of this, the adsorbent 5 and the catalyst 6 may be supported by or coated on the electric heater 4.

A temperature sensor 14 for measuring the temperature of the exhaust gas is arranged in the exhaust passage 3 at a location downstream of the electric heater 4 and upstream of the adsorbent 5. The temperature sensor 14 may be a sensor that detects the temperature of the adsorbent 5 and the temperature of the catalyst 6. The position in which the temperature sensor 14 is mounted is not limited to the one shown in FIG. 1, but instead should just be a position in which the temperature of the adsorbent 5 and the temperature of the catalyst 6 are able to be detected.

Then, in the internal combustion engine 1, there is arranged in combination therewith the ECU 10 which is an electronic control unit (controller) for controlling the internal combustion engine 1 and the electric motor 2. This ECU 10 is provided with a CPU and other elements such as a ROM, a RAM and so on, for storing a variety of kinds of programs and maps, and controls the internal combustion engine 1, the electric motor 2 and so on in accordance with the operating conditions of the internal combustion engine 1 and/or user's requirements.

Besides the above-mentioned temperature sensor 14, an accelerator opening sensor 12, which serves to detect an engine load by outputting an electrical signal corresponding to an amount by which a driver depressed an accelerator pedal 11, and a crank position sensor 13, which serves to detect an engine rotation speed, are connected to the ECU 10 through electrical wiring, so that the output signals of these various kinds of sensors are inputted to the ECU 10. In addition, the voltage control device 21 is connected to the ECU 10 through electrical wiring, so that the ECU 10 controls the supply of current (electrical energization) to the electric heater 4 by operating the voltage control device 21.

In addition, the battery 20 is connected to the ECU 10, so that the ECU 10 calculates a residual capacity (SOC) of the battery 20. Further, the electric motor 2 is connected to the ECU 10 through electrical wiring, so that the ECU 10 controls the supply of electric power (electrical energization) to the electric motor 2 and the generation of electrical energy (power generation) in the electric motor 2. When the SOC is large, the ECU 10 drives the hybrid vehicle 100 by means of the electric motor 2, whereas when the SOC becomes small, the ECU 10 starts the internal combustion engine 1 so that the recovery of the SOC is attained, and at the same time, the hybrid vehicle 100 is driven to operate by the internal combustion engine 1.

Then, before starting of the internal combustion engine 1, the ECU 10 carries out temperature rise control which is to raise the temperature of the electric heater 4. The temperatures of the adsorbent 5 and the catalyst 6 are raised by this temperature rise control. In the temperature rise control, the ECU 10 adjusts the amount of electric power to be supplied to the electric heater 4 from the battery 20. Here, note that even if the heat generated in the electric heater 4 before starting of the internal combustion engine 1 is conducted to the adsorbent 5 and the catalyst 6 through the gas in the exhaust passage 3, even if there is no gas flow in the exhaust passage 3.

The ECU 10 continues to supply electric power to the electric heater 4 until the amount of electric power supplied to the electric heater 4 becomes a target amount of electric power. Then, the ECU 10 will start the internal combustion engine 1, when the amount of electric power supplied to the electric heater 4 reaches the target amount of electric power. Here, note that the hybrid vehicle 100 can be driven by the electric motor 2, even before the internal combustion engine 1 is started. The ECU 10 decides, based on the SOC of the battery 20, the target temperature of the adsorbent 5 or the catalyst 6 at the time of starting of the internal combustion engine 1 and the amount of electric power to be supplied to the electric heater 4 from the battery 20 before the starting of the internal combustion engine 1. Here, note that in cases where the SOC is referred to below, it indicates the SOC of the battery 20 reserved for supplying electric power to the electric heater 4. Accordingly, it is hereinafter assumed that even if the SOC of the battery 20 is 0, the electric power required for equipment other than electric heater 4, such as the electric power required for starting of the internal combustion engine 1, the electric power required for traveling of the hybrid vehicle 100, etc., is reserved.

Figure 2:
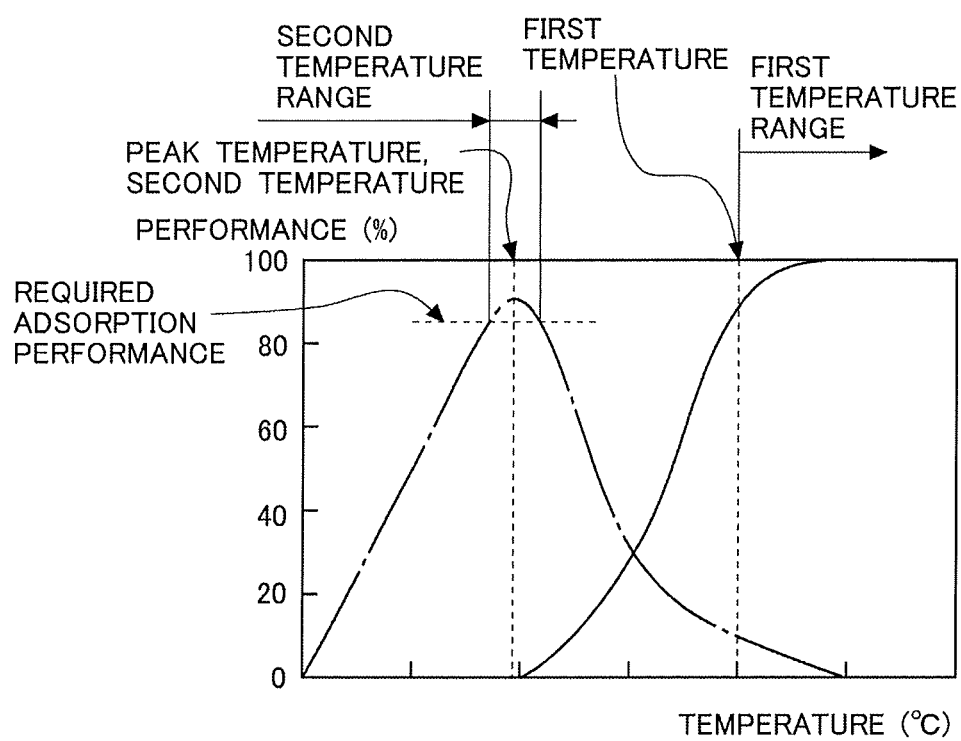
FIG. 2 is a view showing the performance of an adsorbent and a catalyst with respect to temperature.

FIG. 2 is a view showing the performance of the adsorbent 5 and the catalyst 6 with respect to temperature. In FIG. 2, a solid line indicates the catalyst 6, and an alternate long and short dash line indicates the adsorbent 5. The performance of the adsorbent 5 shows the ratio of the amount of NOx to be adsorbed to the adsorbent 5 with respect to the amount of NOx flowing into the adsorbent 5, in the case of assuming that NOx has not been adsorbed in the adsorbent 5. Hereinafter, this performance is also referred to as adsorption performance. In addition, the performance of the catalyst 6 shows the ratio of the amount of NOx to be purified or reduced in the catalyst 6 with respect to the amount of NOx flowing into the catalyst 6. Hereinafter, this performance is also referred to as purification performance. In FIG. 2, a temperature range in which the catalyst 6 is activated is referred to as a first temperature range, and a lower limit value of the activation temperature of the catalyst 6 is referred to as a first temperature. The first temperature can also be said as a temperature at the time when the purification performance in the catalyst 6 becomes a lower limit value of an allowable range. Here, note that the first temperature may also be an arbitrary temperature within the first temperature range. For example, in order that the temperature of the catalyst 6 certainly exceeds the lower limit value of the activation temperature when the catalyst 6 is heated by setting the first temperature as a target, the first temperature may be a value which is obtained by adding a certain amount of margin to this lower limit value. Moreover, a temperature range of the adsorbent 5 in which the adsorbent 5 exhibits the adsorption performance required at the time of starting of the internal combustion engine 1 is referred to as a second temperature range, and an arbitrary temperature within the second temperature range is referred to as a second temperature. For example, the second temperature may be a lower limit value or an upper limit value of the second temperature range, or may be a temperature at which the adsorption performance of the adsorbent 5 becomes the highest (a "peak temperature" to be explained below). Further, the second temperature may be a value which is obtained by adding a certain amount of margin to the lower limit value of the second temperature range, or the second temperature may be a value which is obtained by subtracting a certain amount of margin from the upper limit value of the second temperature range. As shown in FIG. 2, there is no overlap between the first temperature range and the second temperature range, and the first temperature range is higher in temperature than the second temperature range.

Here, note that in this embodiment, the first temperature range corresponds to "a temperature range in which the catalyst is activated" in the present disclosure. Also, in this embodiment, the first temperature corresponds to "a lower limit value of the temperature range in which the catalyst is activated" in the present disclosure. In addition, in this embodiment, the second temperature corresponds to a predetermined temperature in the present disclosure. Moreover, in this embodiment, the second temperature range corresponds to "a temperature range in which the adsorbent exhibits adsorption performance required at the time of starting of the internal combustion engine" in the present disclosure.

In the temperature range shown in FIG. 2, the higher the temperature of the catalyst 6, the higher the purification performance of the catalyst 6 becomes. On the other hand, there exists a peak in the adsorption performance of the adsorbent 5. Hereinafter, a temperature at which the adsorption performance of the adsorbent 5 becomes the peak is also referred to as a peak temperature. The lower the temperature of the adsorbent 5 becomes than the peak temperature, the more the adsorption performance of the adsorbent 5 drops, whereas the higher the temperature of the adsorbent 5 becomes than the peak temperature, the more the adsorption performance of the adsorbent 5 drops. In cases where the temperature of the adsorbent 5 is lower than the peak temperature, water becomes easy to be adsorbed to the adsorbent 5 due to competitive adsorption. When water is adsorbed to the adsorbent 5, NOx becomes unable to be adsorbed to the adsorbent 5 by the amount of water thus adsorbed, so the NOx adsorption performance in the adsorbent 5 drops. In such a range where the temperature of the adsorbent 5 is lower than the peak temperature, the higher the temperature of the adsorbent 5, the easier water becomes to evaporate from the adsorbent 5, so the higher the NOx adsorption performance of the adsorbent becomes. Then, at the peak temperature, the adsorbent 5 is in a state where water has not substantially been adsorbed in the adsorbent 5. Here, note that the water adsorbed in the adsorbent 5 evaporates at 100 degrees C. However, in a process in which the temperature of the adsorbent 5 is raised, even if the temperature of the adsorbent 5 reaches 100 degrees C., the temperature of a part of the water adsorbed in the adsorbent 5 may not reach 100 degrees C. For this reason, in the process in which the temperature of the adsorbent 5 is raised, the water in the adsorbent 5 evaporates completely after the temperature of the adsorbent 5 exceeds 100 degrees C., so the peak temperature can become higher than 100 degrees C. In the range where the temperature of the adsorbent 5 is higher than the peak temperature, the higher the temperature of the adsorbent 5 becomes, the easier NOx becomes to desorb from the adsorbent 5, so the NOx adsorption performance of the adsorbent 5 drops.

At the time of starting of the internal combustion engine 1, a particularly large amount of NOx is discharged from each combustion chamber. Accordingly, it is desired to decrease the concentration of NOx in the exhaust gas flowing out from the catalyst 6 at the time of starting of the internal combustion engine 1. Here, by supplying to the electric heater 4 an amount of electric power required to raise the temperature of the catalyst 6 to the first temperature as the target amount of electric power, before the internal combustion engine 1 is started, it becomes possible to sufficiently purify or reduce the NOx discharged from the internal combustion engine 1 after starting of the internal combustion engine 1 in the catalyst 6.

However, a larger amount of electric power is required in order to raise the temperature of the catalyst 6 to the first temperature, so a case is considered where the SOC of the battery 20 is short or insufficient. Here, reference will be made to an SOC of the battery 20 required to raise the temperature of the catalyst 6 to the first temperature (hereinafter, also referred to as a first predetermined SOC), and an SOC of the battery 20 required to raise the temperature of the adsorbent 5 to the second temperature (hereinafter, also referred to as a second predetermined SOC). Here, note that the first predetermined SOC in this embodiment corresponds to a first predetermined value in the present disclosure, and the second predetermined SOC in this embodiment corresponds to a second predetermined value in the present disclosure.

The first predetermined SOC is proportional to a value which is obtained by subtracting the temperature of the catalyst 6 at the current point of time from the lower limit value of the activation temperature of the catalyst 6 (the first temperature), i.e., an amount of temperature rise in the catalyst 6, and a heat capacity of the exhaust system from the electric heater 4 to the catalyst 6. Here, note that the temperature of the catalyst 6 at the current point of time is a temperature which is detected by the temperature sensor 14. In addition, the heat capacity from the electric heater 4 to the catalyst 6 can be obtained in advance through experiments, simulations, or the like. An amount of heat required to raise the temperature of the catalyst 6 to the first temperature can be obtained from the above-mentioned relation. Moreover, a heating efficiency of the electric heater 4 is taken into consideration. That is, the amount of electric power supplied to the electric heater 4 from the battery 20 is not fully utilized for raising the temperature of the exhaust system, but there is a certain amount of loss, so the amount of electric power is calculated by further adding this amount of loss. The heating efficiency of the electric heater 4 can be obtained in advance through experiments, simulations, or the like. In addition, a correction coefficient for correcting the amount of electric power, which has been calculated from the amount of temperature rise in the catalyst 6 and the heat capacity of the exhaust system from the electric heater 4 to the catalyst 6, according to the heating efficiency of the electric heater 4 has been obtained in advance. Then, the first predetermined SOC is calculated by multiplying the correction coefficient according to the heating efficiency to the amount of electric power calculated from the amount of temperature rise in the catalyst 6 and the heat capacity from the electric heater 4 to the catalyst 6.

Figure 3:
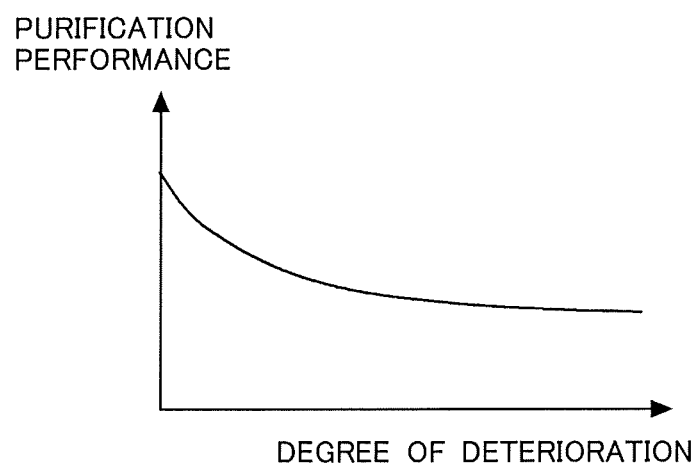
FIG. 3 is a view showing the relation between the degree of deterioration of the catalyst and the purification performance of the catalyst.

Here, note that the purification performance of the catalyst 6 changes according to the degree of deterioration of the catalyst 6. Here, FIG. 3 is a view showing the relation between the degree of deterioration of the catalyst 6 and the purification performance of the catalyst 6. Thus, when the degree of deterioration of the catalyst 6 becomes high, the purification performance of the catalyst 6 drops. In that case, the relation shown in FIG. 2 will change according to the degree of deterioration of the catalyst 6, so that the higher the degree of deterioration, the smaller an amount of increase of the purification performance with respect to an amount of rise in temperature becomes. For that reason, the temperature at which the required purification performance is exhibited shifts to a higher side. That is, the higher the degree of deterioration, the higher the first temperature becomes, and hence, in order to raise the temperature of the catalyst 6 to the first temperature, a larger amount of electric power is required. For this reason, the first temperature may be corrected according to the degree of deterioration of the catalyst 6. The relation between the degree of deterioration of the catalyst 6 and the first temperature has been obtained in advance by experiments, simulations or the like, and the first temperature according to the degree of deterioration of the catalyst 6 is used at the time of calculation of the above-mentioned first predetermined SOC. Here, note that the degree of deterioration of the catalyst 6 may be estimated based on the change over time of the past temperature of the catalyst 6, or the past operating state of the internal combustion engine 1, or may be calculated based on the concentration of a component of the exhaust gas detected at the time of the last operation of the internal combustion engine 1. A method of obtaining the degree of deterioration of the catalyst 6 is well-known, and an explanation thereof is omitted here.

Next, the second predetermined SOC will be explained. The second predetermined SOC is proportional to a value which is obtained by subtracting the temperature of the adsorbent 5 at the current point of time from the second temperature, i.e., an amount of temperature rise in the adsorbent 5, and a heat capacity of the exhaust system from the electric heater 4 to the adsorbent 5. Here, note that the temperature of the adsorbent 5 at the current point of time is a temperature which is detected by the temperature sensor 14. In addition, the heat capacity from the electric heater 4 to the adsorbent 5 can be obtained in advance through experiments, simulations, or the like. An amount of heat required to raise the temperature of the adsorbent 5 to the second temperature can be obtained from the above-mentioned relation. Moreover, the heating efficiency of the electric heater 4 is taken into consideration, as mentioned above. That is, the amount of electric power is calculated by further adding a lost amount of heat in the exhaust system, as mentioned above. Further, a correction coefficient for correcting the amount of electric power, which has been calculated from the amount of temperature rise in the adsorbent 5 and the heat capacity of the exhaust system from the electric heater 4 to the adsorbent 5, according to the heating efficiency of the electric heater 4 has been obtained in advance. Then, the second predetermined SOC is calculated by multiplying the correction coefficient according to the heating efficiency to the amount of electric power calculated from the amount of temperature rise in the adsorbent 5 and the heat capacity from the electric heater 4 to the adsorbent 5.

Figure 4:
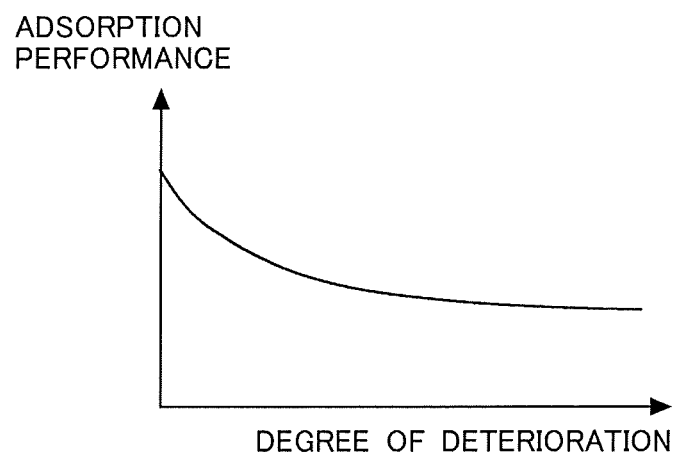
FIG. 4 is a view showing the relation between the degree of deterioration of the adsorbent and the adsorption performance of the adsorbent.

Here, note that the adsorption performance of the adsorbent 5 changes according to the degree of deterioration of the adsorbent 5. Here, FIG. 4 is a view showing the relation between the degree of deterioration of the adsorbent 5 and the adsorption performance of the adsorbent 5. Thus, when the degree of deterioration of the adsorbent 5 becomes high, the adsorption performance of the adsorbent 5 drops. In that case, the relation shown in FIG. 2 will change according to the degree of deterioration of the adsorbent 5, so the higher the degree of deterioration, the lower a maximum value of the adsorption performance corresponding to the peak temperature becomes. Accordingly, the second temperature range becomes narrower. For example, in cases where the lower limit value or the upper limit value of the second temperature range or a temperature relevant to these limit values is selected as the second temperature, the second temperature changes according to the degree of deterioration of the adsorbent 5. For this reason, the second temperature may be corrected according to the degree of deterioration of the adsorbent 5. The relation between the degree of deterioration of the adsorbent 5 and the second temperature has been obtained in advance by experiments, simulations or the like, and this second temperature is used at the time of calculation of the above-mentioned second predetermined SOC. Here, note that the degree of deterioration of the adsorbent 5 may be estimated based on the change over time of the past temperature of the adsorbent 5, or the past operating state of the internal combustion engine 1, or may be calculated based on the concentration of a component of the exhaust gas detected at the time of the last operation of the internal combustion engine 1. A method of obtaining the degree of deterioration of the adsorbent 5 is well-known, and an explanation thereof is omitted here.

Here, consideration is given to the case where the amount of electric power capable of being supplied to the electric heater 4 is fully supplied, in cases where the SOC of the battery 20 is sufficient for raising the temperature of the adsorbent 5 above the upper limit value of the second temperature range, but is insufficient for raising the temperature of the catalyst 6 to the first temperature. In this case, the temperature of the adsorbent 5 exceeds the upper limit value of the second temperature range, and the temperature of the catalyst 6 becomes lower than the first temperature.

In cases where the temperature of the adsorbent 5 is higher than the upper limit value of the second temperature range, the adsorption performance of the adsorbent 5 is not sufficient to adsorb the NOx often generated at the time of starting of the internal combustion engine 1, and hence, a part of the NOx which has not been able to be adsorbed by the adsorbent 5 at the time of starting of the internal combustion engine 1 flows into the catalyst 6. Moreover, the higher the temperature of the adsorbent 5 at the time of starting of the internal combustion engine 1, the lower the NOx adsorption performance becomes, so a larger amount of NOx flows into the catalyst 6. In this temperature range, the higher the temperature of the catalyst 6, the higher the purification performance of the catalyst 6 becomes, so NOx is able to be purified or reduced to some extent in the catalyst 6, but in cases where the concentration of NOx in the exhaust gas flowing into the catalyst 6 is high, such as at the time of starting of the internal combustion engine 1, the catalyst 6 can not remove or reduce NOx to a sufficient extent. That is, the concentration of NOx in the exhaust gas flowing out from the catalyst 6 at the time of starting of the internal combustion engine 1 can become high.

On the other hand, when the amount of electric power to be supplied to the electric heater 4 is adjusted so that the temperature of the adsorbent 5 remains within the second temperature range, the adsorption performance of the adsorbent 5 is sufficiently high, so the concentration of NOx in the exhaust gas flowing out from the adsorbent 5 becomes low. Accordingly, even if NOx can not be reduced in the catalyst 6, the concentration of NOx in the exhaust gas flowing out from the catalyst 6 becomes sufficiently low. That is, in cases where the temperature of the catalyst 6 can not be raised to the first temperature even though an amount of electric power capable of making the temperature of the adsorbent 5 higher than the upper limit value of the second temperature range can be supplied to the electric heater 4, the concentration of NOx in the exhaust gas flowing out from the catalyst 6 at the time of starting of the internal combustion engine 1 can be made lower in the case where an amount of electric power capable of keeping the temperature of the adsorbent 5 within the second temperature range is supplied to the electric heater 4 than otherwise.

Accordingly, in this embodiment, in cases where the SOC is such that only an amount of electric power can be supplied to the electric heater 4 so as to raise the temperature of the adsorbent 5 higher than the second temperature and at the same time the temperature of the catalyst 6 lower than the first temperature, at the time of starting of the internal combustion engine 1, an amount of electric power capable of raising the temperature of the adsorbent 5 up to the second temperature is set as a target amount of electric power. That is, even though an amount of electric power capable of making the temperature of the adsorbent 5 higher than the second temperature can be supplied to the electric heater 4, such an amount of electric power is not supplied, but the amount of electric power to be supplied to the electric heater 4 is kept in such a manner that the temperature of the adsorbent 5 becomes the second temperature.

Although the temperature of the adsorbent 5 becomes the second temperature at the time of starting of the internal combustion engine 1, as mentioned above, the temperatures of the adsorbent 5 and the catalyst 6 go up due to the heat of the exhaust gas, after starting of the internal combustion engine 1. Accordingly, although the temperature of the adsorbent 5 is the second temperature at the time of starting of the internal combustion engine 1, the temperature of the adsorbent 5 will thereafter exceed the upper limit value of the second temperature range, and NOx will gradually desorb from the adsorbent 5. When this NOx flows into the catalyst 6, the temperature of the catalyst 6 has not yet reached the first temperature, so the purification performance of the catalyst 6 is not sufficient. Accordingly, even if NOx can be adsorbed to the adsorbent 5 at the time of starting of the internal combustion engine 1, thereafter, when the temperature of the adsorbent 5 goes up and NOx desorbs from the adsorbent 5, the NOx will flow into the catalyst 6 of which the purification performance is not sufficiently high.

However, after starting of the internal combustion engine 1, the purification performance of the catalyst 6 also gradually becomes high due to the heat of the exhaust gas, as a result of which if the concentration of NOx in the exhaust gas flowing into the catalyst 6 is low, NOx can be purified or reduced to some extent in the catalyst 6. For that reason, even if the temperature of the catalyst 6 is the same in the case where the temperature of the catalyst 6 has not reached the first temperature, the concentration of NOx in the exhaust gas flowing out from the catalyst 6 becomes lower when the concentration of NOx in the exhaust gas flowing into the catalyst 6 is low than when it is high. Accordingly, in order to make low the concentration of NOx in the exhaust gas flowing out from the catalyst 6 in the process in which the temperature of the catalyst 6 goes up to the first temperature, it is preferable to cause a larger amount of NOx often discharged from the internal combustion engine 1 at the time of starting of the internal combustion engine 1 to adsorb to the adsorbent 5. That is, even though the amount of electric power capable of making the temperature of the adsorbent 5 higher than the second temperature can be supplied to the electric heater 4, in cases where the amount of electric power capable of making the temperature of the catalyst 6 higher than the first temperature can not be supplied, the concentration of NOx in the exhaust gas flowing out from the catalyst 6 can be maintained in a low state, by adjusting the amount of electric power to be supplied to the electric heater 4 in such a manner that the temperature of the adsorbent 5 becomes the second temperature.

In addition, when the SOC of the battery 20 is in a sufficient state to make the temperature of the catalyst 6 higher than the first temperature, the target amount of electric power is decided so that the temperature of the catalyst 6 becomes the first temperature, or the temperature of the catalyst 6 becomes within the first temperature range. By starting the internal combustion engine 1 in a state where the temperature of the catalyst 6 is higher than the first temperature, NOx can be sufficiently reduced in the catalyst 6, though not adsorbed to the adsorbent 5, so the concentration of NOx in the exhaust gas flowing out from the catalyst 6 can be made sufficiently low.

On the other hand, in cases where the SOC of the battery 20 is in a state where the temperature of the adsorbent 5 can not be raised to the second temperature, the amount of electric power that can be fully supplied by the SOC of the battery 20 at the current point of time is supplied to the electric heater 4. That is, the temperatures of the adsorbent 5 and the catalyst 6 are made as high as possible. In that case, the amount of NOx to be adsorbed to the adsorbent 5 becomes as large as possible, so the concentration of NOx in the exhaust gas flowing into the catalyst 6 can be made as low as possible. Accordingly, the concentration of NOx in the exhaust gas flowing out from the catalyst 6 can be made as low as possible. In addition, even if the NOx adsorbed to the adsorbent 5 at this time desorbs from the adsorbent 5 with a subsequent rise in temperature of the adsorbent 5, it can be reduced to some extent in the catalyst 6, so that the concentration of NOx in the exhaust gas flowing out from the catalyst 6 is decreased.

Figure 5:
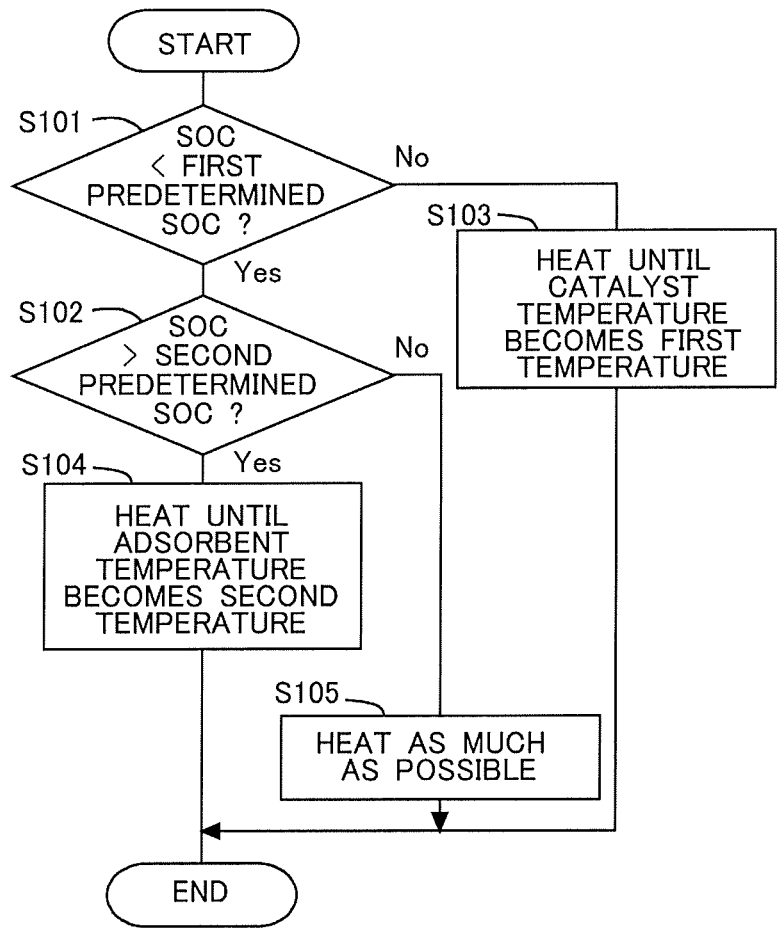
FIG. 5 is a flow chart showing a flow of temperature rise control according to the embodiment.

FIG. 5 is a flow chart showing a flow or routine for the temperature rise control according to this embodiment. The routine in this flow chart is carried out by the ECU 10, in cases where the temperature of the catalyst 6 before starting of the internal combustion engine 1 is lower than the first temperature, or before the internal combustion engine 1 is cold started. Here, note that in this embodiment, the ECU 10 functions as a controller in the present disclosure, by carrying out the routine in this flow chart.

In step S101, it is determined whether the SOC of the battery 20 is smaller than an SOC required to raise the temperature of the catalyst 6 to the first temperature (the first predetermined SOC). In other words, it is determined whether the SOC of the battery 20 is in a state where the temperature of the catalyst 6 can not be sufficiently raised at the time of starting of the internal combustion engine 1. In cases where an affirmative determination is made in step S101, the routine goes to step S102, whereas in cases where a negative determination is made, the routine goes to step S103. In step S103, the target amount of electric power is decided so that the temperature of the catalyst 6 goes up to the first temperature. The target amount of electric power at this time is an amount of electric power corresponding to the first predetermined SOC.

In step S102, it is determined whether the SOC of the battery 20 is larger than an SOC required to raise the temperature of the adsorbent 5 to the second temperature (the second predetermined SOC). In cases where an affirmative determination is made in step S102, the routine goes to step S104, whereas in cases where a negative determination is made, the routine goes to step S105.

In step S104, the target amount of electric power is decided so that the temperature of the adsorbent 5 goes up to the second temperature. The target amount of electric power at this time is an amount of electric power corresponding to the second predetermined SOC. On the other hand, in step S105, the target amount of electric power is decided so that the temperatures of the adsorbent 5 and the catalyst 6 become the highest according to the SOC of the battery 20. The target amount of electric power at this time is an amount of electric power corresponding to an SOC of the battery 20 at the current point of time, and is an amount of electric power which heats the adsorbent 5 as much as possible.

As described above, according to this embodiment, in cases where the SOC of the battery 20 is in a state where the temperature of the catalyst 6 can not be sufficiently raised at the time of starting of the internal combustion engine 1, NOx discharged from the internal combustion engine 1 at the time of starting of the internal combustion engine 1 can be caused to adsorb to the adsorbent 5 in a larger amount, by enhancing the adsorption performance of the adsorbent 5. The NOx thus adsorbed can be reduced in the catalyst 6 later. Accordingly, the concentration of NOx in the exhaust gas flowing out from the catalyst 6 can be further decreased, an NOx reduction rate in the entire system can be maintained high. On the other hand, in cases where the SOC of the battery 20 is in a state where the temperature of the catalyst 6 can be sufficiently raised at the time of starting of the internal combustion engine 1, the NOx reduction rate at the time of starting of the internal combustion engine 1 can be made high, by enhancing the temperature of the catalyst 6 to a sufficient extent. In addition, in cases where the SOC of the battery 20 is in a state where the temperature of the adsorbent 5 can not be sufficiently raised at the time of starting of the internal combustion engine 1, the concentration of NOx in the exhaust gas flowing out from the catalyst 6 can be decreased as much as possible, by enhancing the temperatures of the adsorbent 5 and the catalyst 6 as much as possible.

The invention claimed is:

1. An exhaust gas purification apparatus for an internal combustion engine comprising:
    an adsorbent that is arranged in an exhaust passage of the internal combustion engine and configured to adsorb a predetermined component contained in an exhaust gas of the internal combustion engine;
    a catalyst that is arranged in said exhaust passage at a location downstream of said adsorbent and configured to purify said predetermined component;
    a heat generating element that is arranged in said exhaust passage and is supplied with electric power to generate heat thereby to heat said adsorbent and said catalyst;
    a battery configured to supply electric power to said heat generating element; and
    a controller configured to adjust an amount of electric power to be supplied to said heat generating element from said battery such that in cases where a residual capacity of said battery is smaller than a first predetermined value required for raising the temperature of said catalyst to a lower limit value of a temperature range in which said catalyst is activated, and in cases where the residual capacity of said battery is larger than a second predetermined value which is smaller than said first predetermined value and which is required for raising the temperature of said adsorbent to a predetermined temperature within a temperature range in which said adsorbent exhibits adsorption performance required at the time of starting of said internal combustion engine, the temperature of said adsorbent becomes said predetermined temperature.

2. The exhaust gas purification apparatus for an internal combustion engine as set forth in claim 1, wherein
    in cases where the residual capacity of said battery is larger than said first predetermined value, said controller is further configured to adjust the amount of electric power to be supplied to said heat generating element from said battery such that the temperature of said catalyst becomes said temperature range in which said catalyst is activated.

3. The exhaust gas purification apparatus for an internal combustion engine as set forth in claim 1, wherein
    in cases where the residual capacity of said battery is smaller than said second predetermined value, said controller is further configured to supply an amount of electric power corresponding to the residual capacity to said heat generating element from said battery.

4. The exhaust gas purification apparatus for an internal combustion engine as set forth in claim 1, wherein said controller is further configured to correct said first predetermined value according to a degree of deterioration of said catalyst.

5. The exhaust gas purification apparatus for an internal combustion engine as set forth in claim 1, wherein
said controller is further configured to correct said second predetermined value according to a degree of deterioration of said adsorbent.

* * * * *